(12) United States Patent
Weisz et al.

(10) Patent No.: US 12,165,628 B2
(45) Date of Patent: Dec. 10, 2024

(54) IDENTIFICATION AND UTILIZATION OF MISRECOGNITIONS IN AUTOMATIC SPEECH RECOGNITION

(71) Applicant: Google LLC, Mountain View, CA (US)

(72) Inventors: Ágoston Weisz, Zurich (CH); Ignacio Lopez Moreno, New York, NY (US); Alexandru Dovlecel, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 793 days.

(21) Appl. No.: 17/251,284

(22) PCT Filed: Jul. 8, 2020

(86) PCT No.: PCT/US2020/041223
§ 371 (c)(1),
(2) Date: Dec. 11, 2020

(87) PCT Pub. No.: WO2022/010471
PCT Pub. Date: Jan. 13, 2022

(65) Prior Publication Data
US 2022/0139373 A1    May 5, 2022

(51) Int. Cl.
*G10L 15/06*    (2013.01)
*G10L 15/02*    (2006.01)
*G10L 15/22*    (2006.01)

(52) U.S. Cl.
CPC ............ *G10L 15/063* (2013.01); *G10L 15/02* (2013.01); *G10L 15/22* (2013.01); *G10L 2015/025* (2013.01)

(58) Field of Classification Search
CPC ........ G10L 15/00; G10L 15/063; G10L 15/02; G10L 15/22; G10L 2015/025
See application file for complete search history.

(56) References Cited

U.S. PATENT DOCUMENTS

2007/0038436 A1    2/2007  Cristo et al.
2009/0132249 A1*  5/2009  Tu ..................... G10L 15/065
                                                704/243
(Continued)

FOREIGN PATENT DOCUMENTS

WO    WO-02089112 A1 * 11/2002  ........... G10L 15/065
WO    2019163242        8/2019

OTHER PUBLICATIONS

European Patent Office; International Search Report and Written Opinion of PCT/US2020/041223; 13 pages; dated Mar. 23, 2021.
(Continued)

*Primary Examiner* — Daniel C Washburn
*Assistant Examiner* — Sean E Serraguard
(74) *Attorney, Agent, or Firm* — Gray Ice Higdon (57) ABSTRACT

Techniques are disclosed that enable determining and/or utilizing a misrecognition of a spoken utterance, where the misrecognition is generated using an automatic speech recognition (ASR) model. Various implementations include determining a recognition based on the spoken utterance and a previous utterance spoken prior to the spoken utterance. Additionally or alternatively, implementations include personalizing an ASR engine for a user based on the spoken utterance and the previous utterance spoken prior to the spoken utterance (e.g., based on audio data capturing the previous utterance and a text representation of the spoken utterance).

16 Claims, 5 Drawing Sheets

(56) References Cited

U.S. PATENT DOCUMENTS

| | | |
|---|---|---|
| 2010/0125458 A1 | 5/2010 | Franco et al. |
| 2014/0365226 A1* | 12/2014 | Sinha .................. G10L 15/22 |
| | | 704/275 |
| 2015/0243278 A1* | 8/2015 | Kibre ................. G10L 15/187 |
| | | 704/243 |
| 2016/0063998 A1* | 3/2016 | Krishnamoorthy ..... G10L 15/22 |
| | | 704/254 |
| 2019/0206389 A1* | 7/2019 | Kwon .................. G10L 15/07 |
| 2019/0272822 A1 | 9/2019 | Baldwin et al. |
| 2019/0287519 A1 | 9/2019 | Ediz et al. |
| 2020/0143806 A1 | 5/2020 | Sreedhara |
| 2021/0375272 A1* | 12/2021 | Madwed ............... G06F 3/167 |

OTHER PUBLICATIONS

European Patent Office; Intention to Grant issued in Application No. 20750038.0; 46 pages; dated Jul. 6, 2023.

* cited by examiner

IDENTIFICATION AND UTILIZATION OF MISRECOGNITIONS IN AUTOMATIC SPEECH RECOGNITION

BACKGROUND

Voice-based user interfaces are increasingly being used in the control of computers and other electronic devices. Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces perform speech recognition (e.g., using an automatic speech recognition model) on a spoken utterance to generate corresponding text, perform a semantic analysis of the text in an attempt to determine the meaning of the spoken utterance, and/or undertake one or more actions based on the determined meaning.

While speech recognition performance has continued to improve, inaccurate speech recognition can still occur for many situations. As a non-limiting example, inaccurate speech recognition can occur for new terms and/or for terms that are relatively infrequent (or non-existent) in a training corpus on which a speech recognition model is trained. In an attempt to effectively recognize new terms and/or infrequent terms, techniques have been proposed to generate additional speech recognition hypotheses that are in addition to an initial hypothesis (or initial hypotheses), and consider the additional speech recognition hypotheses as candidates for speech recognition. However, such techniques require additional post-processing, and can still fail to lead to effective recognition of many terms in many situations, such as when the initial hypothesis/hypotheses are too far off-base and/or when a lexicon for the additional hypotheses does not include certain terms.

SUMMARY

Implementations described herein are directed towards identifying and/or utilizing a misrecognition of a spoken utterance by an automatic speech recognition ("ASR") engine. In some implementations, a misrecognition engine can be used to identify a pair of utterances which may include an utterance spoken by a user and a subsequent utterance spoken by the user, where the subsequent utterance is spoken by the user as a result of a text representation of the utterance being a misrecognition of the utterance. For example, a user can speak the utterance of "OK Assistant, how do I get to Hypothetical Cat Café". The ASR engine can be used in generating a text representation of the utterance of "OK Assistant, how do I get to Hypothetical Bat Café", where 'Bat' is a misrecognition of 'Cat'. Additionally or alternatively, the user can speak the subsequent utterance of "OK Assistant, how do I get to Hypothetical CAT Café" as a result of the text representation of the utterance being a misrecognition, where the ASR engine can be used in generating a subsequent text representation of the subsequent utterance of "OK Assistant, how do I get to Hypothetical Cat Café". As described herein, a "misrecognition pair" can indicate (1) the utterance and/or the corresponding text representation of the utterance and (2) the subsequent utterance and/or the corresponding subsequent text representation of the subsequent utterance.

In some implementations, misrecognition pair(s) can be used to personalize the ASR engine for the speaker. For example, the misrecognition pair(s) can be used to train a personalized ASR model for the speaker. Additionally or alternatively, the misrecognition pair(s) can be used to rewrite a further text representation of a further utterance spoken by the user. Furthermore, in some implementations, the misrecognition pair(s) can additionally or alternatively be used to modify one or more portions of a word lattice of the ASR model, where the modified word lattice can be used by the ASR model in generating a further text representation of a further spoken utterance.

In some implementations, a misrecognition engine can be used in determining whether an utterance and a subsequent utterance is a misrecognition pair. For example, a user may speak the utterance of "play hypothetical song name" and subsequently speak the subsequent utterance of "play HYPOTHETICAL song name" in response to a computing system playing the incorrect song, where the user spoke the subsequent utterance of "play HYPOTHETICAL song name" in response to the misrecognition of the utterance "play hypothetical song name". In some implementations, the misrecognition engine can be used to determine whether the subsequent utterance was spoken based on the text representation of an utterance being a misrecognition of the utterance. For example, the misrecognition engine can determine a misrecognition pair based on one or more of: (1) the duration of time between the utterance and the subsequent utterance; (2) the phonetic similarity between the utterance and the subsequent utterance; (3) the number of times the user has spoken at least a portion of the utterance and/or subsequent utterance; and/or based on additional or alternative condition(s). In some implementations, the misrecognition engine can determine whether the time between when the user spoke the utterance and subsequent utterance satisfies one or more conditions (e.g., whether the time is below a threshold value, whether the utterance and subsequent utterance are spoken in the same dialog session, and/or whether the time satisfies one or more additional or alternative conditions). For example, the misrecognition engine can determine an utterance and subsequent utterance is a misrecognition pair based on (e.g., based solely on, or in combination with other condition(s)) the utterance and the subsequent utterance occurring in the same dialog session, occurring less than 10 seconds apart, occurring less than 5 seconds apart, occurring less than 3 seconds apart, and/or occurring less than other threshold duration of time apart.

In some implementations, the misrecognition engine can determine whether the phonetic similarity between the utterance and the subsequent utterance satisfies one or more conditions. For example, the condition(s) can include that a phonetic similarity measure exceeds a threshold value, that a phonetic similarity measure between at least a portion of the utterance and at least a portion of the corresponding subsequent utterance exceeds a threshold value, and/or that the similarity measure satisfies one or more other phonetic similarity condition(s). For example, the misrecognition engine can determine an utterance of "play hypothetical song" and a subsequent utterance of "NO, play HYPOTHETICAL SONG" is a misrecognition pair if a phonetic similarity measure between the "hypothetical song" portion of the utterance and "HYPOTHETICAL SONG" portion of the subsequent utterance exceeds a threshold value.

In some implementations, the misrecognition engine can determine whether an utterance and a subsequent utterance is a misrecognition pair based on the number of times a user has spoken at least a portion of the utterance and at least a corresponding portion of the subsequent utterance. For example, the misrecognition can determine an utterance and subsequent utterance are a misrecognition pair based on the misrecognition engine determining the 'John Doe' portion of the utterance "OK Assistant, call John Doe" and the 'John DOE' portion of the subsequent utterance of "NO, call John DOE" occur more than a threshold number of times. In other words, the misrecognition engine can determine an utterance and subsequent utterance is a misrecognition pair when the speaker has corrected the misrecognition (e.g., corrected a misrecognition of the name 'John Doe' by speaking the subsequent utterance) at least a threshold number of times over one or more dialog sessions.

Additionally or alternatively, in some implementations the misrecognition engine can generate multiple misrecognition pairs from a dialog session. For example, the user can speak the utterance of "OK Assistant, turn on kitchen light one", the interposing utterance of "OK Assistant, no turn on kitchen light ONE", and the subsequent utterance of "NO, please turn on only kitchen light one", where the subsequent utterance is spoken subsequent to the utterance and the interposing utterance is interposing between the utterance and the subsequent utterance. In other words, the user speaks the interposing utterance to correct a misrecognition of the utterance, and the user speaker speaks the subsequent utterance to correct a misrecognition of the interposing utterance. In some implementations, the misrecognition engine can be used in determining a first misrecognition pair of the utterance and the subsequent utterance, and a second misrecognition pair of the interposing utterance and the subsequent utterance.

However, the subsequent utterance spoken by a user may not be a correction of a previous utterance. In some cases, a user may simply stop speaking, despite a misrecognition by the ASR engine. In some implementations, the misrecognition engine can determine whether the subsequent utterance portion of a candidate misrecognition pair is corrected in a historical misrecognition pair. In other words, the misrecognition engine can determine whether a subsequent utterance of a misrecognition pair is a historical utterance of a historical misrecognition pair (i.e., whether the subsequent utterance is corrected as a misrecognition in a historical misrecognition pair). In some of those implementations, the misrecognition engine can determine the utterance and subsequent utterance pair is not a misrecognition pair based on the subsequent utterance being corrected in the historical misrecognition pair.

In some implementations, the misrecognition engine can additionally or alternatively determine whether an utterance and subsequent utterance is a misrecognition pair based on contextual information. For example, a user may repeat the utterance "skip" while controlling a music player. However, the phonetic similarity (and/or additional metrics used by a misrecognition engine while determining whether a pair of utterances is a misrecognition pair) between an utterance of "skip" and a subsequent utterance of "skip" does not necessarily indicate a misrecognition pair while the user is playing a song with a music player. In other words, the misrecognition engine can determine, based on contextual information indicating a music player is used to play a song, that a utterance of "skip" and a subsequent utterance of "skip" may not be a misrecognition pair. In contrast, a user can speak an utterance of "Skip" in response to a prompt from a system of "who do you want to send the email to?". The user can speak a subsequent utterance of "SKIP" in response to output from the system of "Sorry, I don't see a Kip in your contacts". In other words, the misrecognition engine can determine, based on the contextual information indicating the user is drafting an email, that the utterance of "Skip" and the subsequent utterance of "SKIP" is a misrecognition pair.

In some implementations, the misrecognition engine can determine whether the utterance and the subsequent utterance are a misrecognition pair based on one or more contextual signals such as one or more short term previous query history contextual signals, one or more long term aggregated history contextual signals, one or more contextual signals based on user action content, and/or one or more additional or alternative contextual signals. In some implementations, the one or more contextual signals can correspond to a user profile of the user, the client device capturing the utterances, and/or the dialog session between the user and the client device.

Accordingly, various implementations set forth techniques for determining misrecognition pairs, where the misrecognition pairs can be used to personalize an ASR engine for a user. Personalization can enable the ASR engine to avoid generating a text representation of a further utterance which is a misrecognition of the further utterance, to automatically rewrite a further text representation which is a misrecognition of a further utterance, and/or otherwise improve ASR performance. In contrast, an ASR engine which has not been personalized may continue to generate text representations which are misrecognitions of utterance. Moreover, a user may have to repeatedly provide subsequent utterances as a result of these misrecognitions generated using the un-personalized ASR engine. In contrast, techniques described herein enable the ASR engine to be personalized based on previous misrecognitions of utterances spoken by the user. In some implementations, the personalized ASR engine does not generate a text representation of an utterance which is a misrecognition of the utterance, where the system previously identified a misrecognition pair corresponding to at least a portion of the utterance. In some cases, computing resources (e.g., processor cycles memory, battery power, etc.) may be conserved by generating one or more text representations of utterances, using the personalized ASR engine, without misrecognition(s) of the one or more utterances. This can prevent the computing system from performing undesired action(s) based on the misrecognized utterance(s) as well as eliminating the need for the user to speak additional utterance(s) in response to the undesired action(s) caused by the misrecognition(s).

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
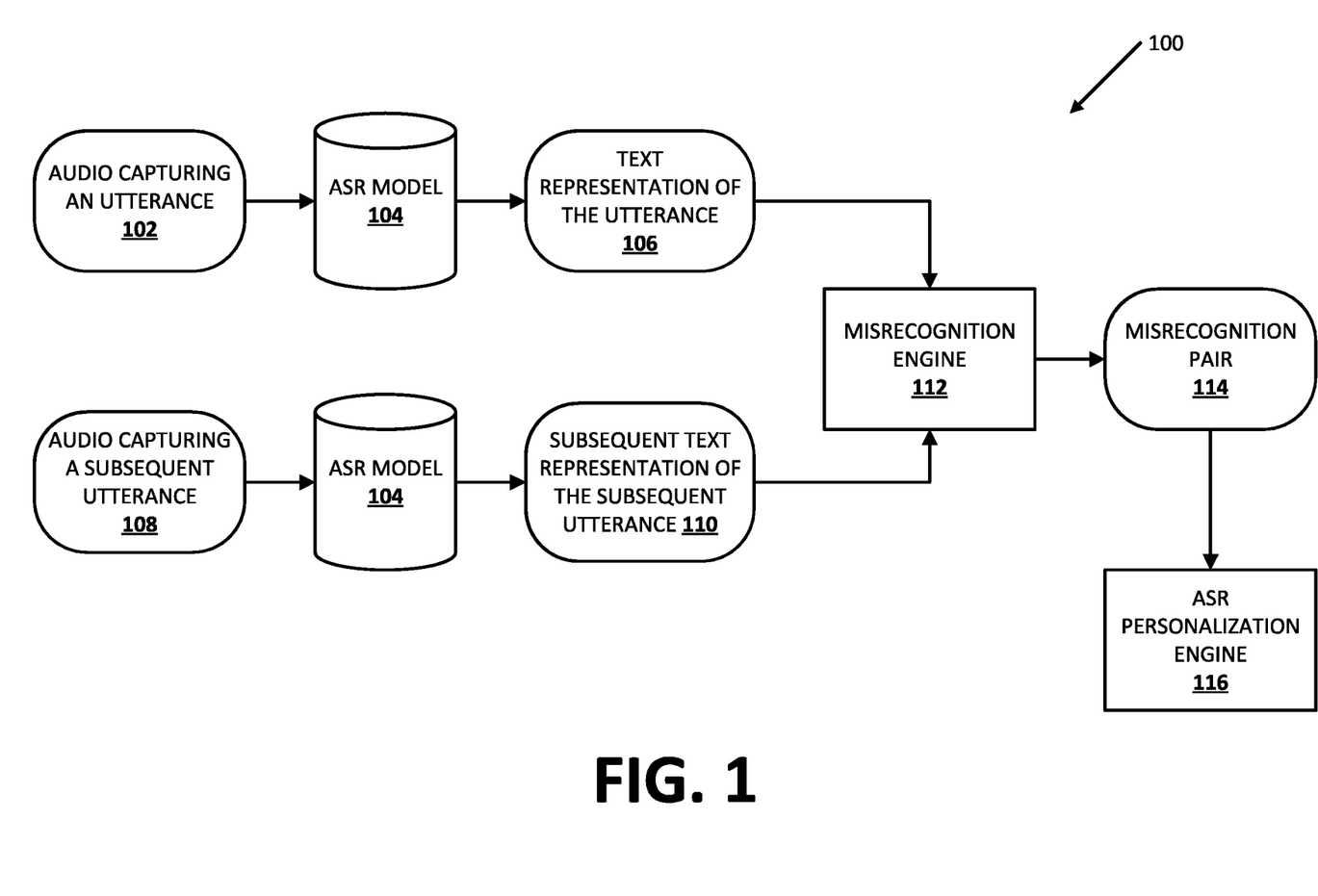
FIG. 1 illustrates an example of identifying a misrecognition pair in accordance with various implementations disclosed herein.

Turning now to the figures, FIG. 1 illustrates a block diagram of an example of identifying a misrecognition pair in accordance with some implementations disclosed herein. The example 100 includes processing audio data capturing an utterance 102 using an ASR model 104 to generate a text representation of the utterance 106. In some implementations, the audio data capturing an utterance 102 can include a spoken utterance captured using one or more microphones of a computing system (e.g., computing system 202 of FIG. 2). In some implementations, ASR model 104 is part of an ASR engine (not depicted). Additionally or alternatively, audio data capturing a subsequent utterance 108 is processed using the ASR model 104 to generate a subsequent text representation of the subsequent utterance 110. In some implementations, the utterance and the subsequent utterance are spoken by the same user. For example, the user can have a dialog session with the computing system where the user speaks the utterance, the computing system (e.g., an automated assistant client of the computing system) performs one or more actions based on a text representation of the utterance, and the user speaks the subsequent utterance in response to the one or more actions performed by the computing system. For example, the computing system can perform one or more actions based on the text representation of the utterance 106 such as controlling one or more networked smart lights, controlling a networked smart thermostat, controlling additional and/or alternative networked smart devices, controlling a music player, rendering output indicating the action(s) being performed by the computing system, and/or performing one or more additional and/or alternative actions.

In some implementations, misrecognition engine 112 can process the text representation of the utterance 106 and the subsequent text representation of the subsequent utterance 110 to determine whether the utterance 106 and the subsequent utterance 110 is a misrecognition pair 114. In other words, the misrecognition engine 112 can determine the misrecognition pair 114 based on whether the user spoke the subsequent utterance 108 based on the text representation of the utterance 106, generated using the ASR model 104, being a misrecognition of the utterance 102. In some implementations, the misrecognition pair 114 can be used by an ASR personalization engine 116 to personalize the ASR engine. However, in some implementations, misrecognition engine 112 can determine the utterance 102 and the subsequent utterance 108 are not a misrecognition pair. In some of those implementations, the utterance 102 and the subsequent utterance 108 may not be used by the ASR personalization engine 116 to personalize the ASR engine.

For example, a user can speak an utterance of "turn off the living room lights" where the living room includes three networked smart lights, one networked smart light being associated with a lamp, and two networked smart lights being associated with an overhead light fixture. Audio data capturing the utterance 102 can be processed using ASR model 104 to generate a text representation of the utterance 106 of "turn off the living room light", where "light" is a misrecognition of "lights" in the utterance 102. The computing system can render output of "ok, turning off the living room lamp light" while turning off the living room lamp (i.e., the computing system can perform undesired actions based on the text representation of the utterance which is a misrecognition of the utterance). The user can speak a subsequent utterance of "no, turn off ALL the living room lights" in response to the text representation of the utterance being a misrecognition of the utterance. The ASR model 104 can process the audio data capturing the subsequent utterance 108 to generate a subsequent text representation of the subsequent utterance 110 of "no, turn off all the living room lights" (i.e., generate a subsequent text representation of the subsequent utterance which is not a misrecognition of the subsequent utterance). Misrecognition engine 112 can determine the utterance 102 and the subsequent utterance 108 are a misrecognition pair 114. Additionally or alternatively, ASR personalization engine 116 can use the misrecognition pair 114 to personalize the ASR engine.

In some implementations, the user can speak an interposing utterance of "turn off the living room lights", interposing between the utterance and the subsequent utterance. The ASR model 104 can be used to process audio data capturing the interposing utterance (not depicted) to generate an interposing text representation of the interposing utterance (not depicted) of "no, turn off the living room light" where "light" is a misrecognition of "lights" in the interposing utterance. The computing system can render output of "ok, turning off the living room lamp light" while turning off the living room lamp. The user can then speak the subsequent utterance of "No, turn off ALL the living room lights", as described above, in response to the misrecognition of the interposing utterance. In some implementations, misrecognition engine 112 can additionally and/or alternatively determine whether the interposing utterance and the subsequent utterance are a misrecognition pair 114. In other words, misrecognition engine 112 can determine two misrecognition pairs 114 from the dialog session (i.e., the utterance and the subsequent utterance, and the interposing utterance and the subsequent utterance).

Additionally or alternatively, in some implementations, the misrecognition engine 112 can determine the utterance and subsequent utterance are not a misrecognition pair. For example, the user can speak a first utterance of "play aucelander by hypothetical foreign band". In some implementations, the ASR model can process audio data capturing the first utterance to generate a first text representation of the first utterance of "play outlander by hypothetical foreign band" where 'outlander' is a misrecognition of 'aucelander'. The computing system can render output of "unable to play outlander by hypothetical foreign band". In response to the rendered output, the user can speak a second utterance of "play aucelander by hypothetical foreign band". The ASR model can be used to process the audio data capturing the second utterance to generate a second text representation of the second utterance of "play Icelander by hypothetical foreign band" where 'icelander' is a misrecognition of 'aucelander'. The computing system can render output of "unable to play Icelander by hypothetical foreign band".

In some implementations, the user can speak a third utterance of "play aucelander by hypothetical foreign band" and the ASR model can be used to process audio data capturing the third utterance to generate a third text representation of the third utterance of "play all slender by hypothetical foreign band". The computing system can render output of "unable to play all slender by hypothetical foreign band". In some implementations, the user may stop speaking additional utterances. However, there may still be a misrecognition generated using the ASR model. In some implementations, misrecognition engine 112 can utilize techniques described herein to determine whether the user stopped speaking additional utterances based on the text representation of the last utterance, generated using the ASR model, is not a misrecognition of the last utterance, or whether the user stopped speaking additional utterances despite a misrecognition of the last utterance (e.g., the user grew frustrated and gave up speaking, the user got distracted, etc.). In some implementations, the misrecognition engine 112 can determine the text representation of the third utterance is still a misrecognition, and the third utterance should not be included in a misrecognition pair 114.

In contrast, in some other implementations, the user can speak an alternative third utterance of "play aucelander by hypothetical foreign band". The ASR model can be used to process audio data capturing the alternative third utterance to generate an alternative third text representation of the alternative third utterance of "play aucelander by hypothetical foreign band" where 'aucelander' is not misrecognized, and the computing system can begin playing the requested song. In some implementations, the misrecognition engine 112 can determine the alternative third text representation of the alternative third utterance is not a misrecognition and the alternative third utterance should be included as part of a misrecognition pair 114 (e.g., a first misrecognition pair of the first utterance and the alternative third utterance and/or a second misrecognition pair of the second utterance and the alternative third utterance).

Figure 2:
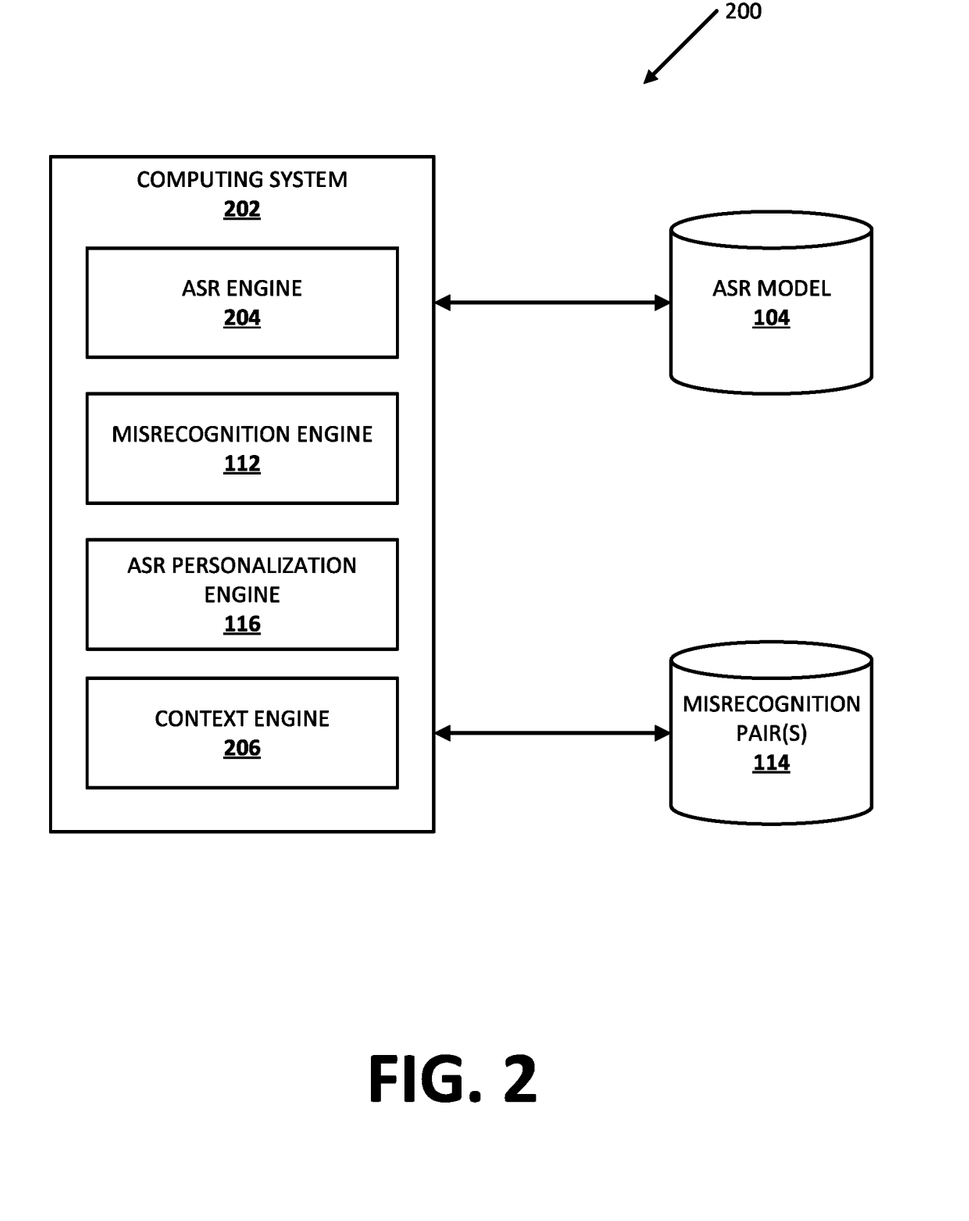
FIG. 2 illustrates an example environment in which various implementations disclosed herein may be implemented.

FIG. 2 illustrates a block diagram of an example environment 200 in which implementations disclosed herein may be implemented. The example environment 200 includes a computing system 202 which can include ASR engine 204, misrecognition engine 112, ASR personalization engine 116, context engine 206, and/or one or more additional engines (not depicted). Additionally or alternatively, computing system 202 may be associated with one or more user interface input/output devices (not depicted). Furthermore, computing system 202 may be associated with ASR model 104, one or more misrecognition pairs 114, and/or one or more additional components (not depicted). In some implementations, ASR model 104 is associated with ASR engine 204.

In some implementations, computing system 202 may include user interface input/output devices, which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 202 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 202 may be implemented on a computing system that also contains the user interface input/output devices. In some implementations computing system 202 may include an automated assistant (not depicted), and all or aspects of the automated assistant may be implemented on computing device(s) that are separate and remote from the client device that contains the user interface input/output devices (e.g., all or aspects may be implemented "in the cloud"). In some of those implementations, those aspects of the automated assistant may communicate with the computing device via one or more networks such as a local area network (LAN) and/or a wide area network (WAN) (e.g., the Internet).

Some non-limiting examples of computing system 202 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 202 may include one or more memories for storage of data and software applications, one or more processors for accessing data and executing applications, and other components that facilitate communication over a network. The operations performed by computing system 202 may be distributed across multiple computing devices. For example, computing programs running on one or more computers in one or more locations can be coupled to each other through a network.

As illustrated in FIG. 2, ASR engine 204 can process one or more spoken utterances to generate a text representation of the one or more utterances. In some implementations, spoken utterance(s) can be captured using one or more user interface input devices (e.g., captured using one or more microphones of computing system 202). In some implementations, ASR model 104 can be used to process utterances to generate a text representation of the utterances. For example, as illustrated in FIG. 1, ASR model 104 can process audio data capturing an utterance 102 to generate a text representation of the utterance 106. Similarly, ASR model 104 can process audio data capturing a subsequent utterance 108 to generate a subsequent text representation of the subsequent utterance 110. In some implementations, ASR model 104 can include one or more of a variety of neural network models including a feed-forward neural network model, a convolutional neural network model, a recurrent neural network model, a hybrid neural network model, and/or one or more additional and/or alternative neural network models.

In some implementations, misrecognition engine 112 can be used to determine whether a user spoke a subsequent utterance as a result of a text representation of an utterance, generated using ASR model 104, is a misrecognition of the utterance. In some implementations, misrecognition engine 112 can determine whether the user spoke the subsequent utterance as a result of the text representation of the utterance being a misrecognition of the utterance in accordance with process 400 of FIG. 4 described herein. Additionally or alternatively, misrecognition engine 112 can store an utterance and a corresponding subsequent utterance as misrecognition pair(s) 114, upon determining an utterance and a subsequent utterance are a misrecognition pair. In some implementations, a misrecognition pair 114 can include (1) audio data capturing the utterance and/or the text representation of the utterance, (2) subsequent audio data capturing the subsequent utterance and/or the subsequent text representation of the subsequent utterance, and/or additional or alternative information relating to the misrecognition pair (e.g., the user who spoke the utterances, etc.). For example, a misrecognition pair can include the audio data capturing the utterance and the subsequent text representation of the subsequent utterance; audio data capturing the utterance, the text representation of the utterance, and the subsequent text representation of the subsequent utterance; audio data capturing the utterance, the text representation of the utterance, subsequent audio data capturing the subsequent utterance, and the subsequent text representation of the subsequent utterance; the text representation of the utterance and the text representation of the subsequent utterance; the text representation of the utterance and the subsequent audio data capturing the subsequent utterance; etc. In some implementations, misrecognition pair(s) 114 can be stored locally at computing system 202. Additionally or alternatively, misrecognition pair(s) 114 can be stored at a remote server remote from computing system 202.

In some implementations, ASR personalization engine 116 can be used to personalize ASR engine 204 for a user. In some implementations, ASR personalization engine 116 can use one or more misrecognition pairs 114 to train the ASR model 104 (e.g., train ASR model 104 through backpropagation using one or more misrecognition pairs 114 as training instance(s). For example, a misrecognition pair can include the audio data capturing the utterance and the subsequent text representation of the subsequent utterance. ASR personalization engine 116 can process the audio data capturing the utterance using the ASR model to generate a text representation of the utterance. Additionally or alternatively, ASR personalization engine 116 can determine a difference between the generated text representation of the utterance and the subsequent text representation of the subsequent utterance. One or more portions of ASR model 104 can be updated based on the determined difference (e.g., through backpropagation). As a further example, a misrecognition pair 114 can include the text representation of the utterance and the subsequent text representation of the subsequent utterance. ASR personalization engine 116 can determine a difference between the text representation of the utterance and the subsequent text representation of the subsequent utterance. One or more portions of the ASR model 104 can be updated based on the determined difference (e.g., through backpropagation).

In some implementations, ASR personalization engine 116 can be used to rewrite one or more portions of a further text representation of a further utterance based on misrecognition pair(s) 114. For example, a misrecognition pair can include (1) a text representation of an utterance of "dim the kitchen lights to 70 percent", where "70 percent" is a misrecognition of "72 percent" in the utterance, and (2) a subsequent text representation of a subsequent utterance of "dim the kitchen lights to 72 percent". In some implementations, the user can speak a further utterance of "dim the living room lights to 72 percent". Audio data capturing the utterance can be processed using the ASR model to generate a further text representation of the further utterance of "dim the living room lights to 70 percent" where "70 percent" is a misrecognition of "72 percent" (i.e., the same (or substantially similar) misrecognition as the misrecognition pair). In some implementations, ASR personalization engine 116 can rewrite the further text representation of the further utterance, based on the misrecognition pair, where the rewritten further text representation of the further utterance can be rewritten as "dim the living room lights to 72 percent" based on the misrecognition pair.

In some implementations, ASR personalization engine 116 can be used can be used to rewrite one or more portions of a further text representation of a further utterance based on a portion misrecognition pair(s) 114. For example, ASR personalization engine 116 can use the subsequent text representation of a subsequent utterance portion of a misrecognition pair 114 to generate a candidate rewrite of the further text representation of the further utterance that may not otherwise have been a candidate rewrite of the further text representation of the further utterance. Additionally or alternatively, ASR personalization engine 116 can use the subsequent text representation of a subsequent utterance portion of a misrecognition pair 114 to change the weight of a candidate rewrite (e.g., increase the weight of a candidate rewrite) that would have otherwise been a candidate rewrite of the further text representation of the further utterance.

Additionally or alternatively, ASR personalization engine 116 can modify one or more portions of a word lattice generated by the ASR model, while generating a further text representation of a further utterance, based on one or more misrecognition pairs 114. For example, a misrecognition pair can include (1) a text representation of an utterance of "Assistant, please call John Doe", where "John Doe" is a misrecognition of "John Foe" in the utterance, and (2) a subsequent text representation of a subsequent utterance of "Assistant, please call John Foe". The ASR model can generate a word lattice when generating a text representation of further utterance of "OK Assistant, send this document to John Foe". In some implementations, ASR personalization engine 116 can modify the word lattice based on the misrecognition pair. For instance, ASR personalization engine 116 can insert a representation of "Foe" into the word lattice in addition to the representation of "Doe" in the word lattice, providing the ASR model with additional or alternative candidate text representations of one or more portions of the further utterance while generating the further text representation of the further utterance. In some implementations, the system can generate a further text representation of the further utterance of "OK Assistant, send this document to John Foe" based on the modified word lattice. In contrast, without modification, the system may have generated a further text representation of the further utterance of "OK Assistant, send this document to John Doe", where "Doe" is a misrecognition of "Foe". In other words, modifying the word lattice can provide the ASR model with additional candidate text recognitions of one or more portions of the further utterance, providing the ASR model with the ability to generate a further text representation of the further utterance without a misrecognition of the further utterance, where the ASR model may have generated the further text representation of the further utterance with a misrecognition of the further utterance without the modification(s) of the word lattice.

Additionally or alternatively, ASR personalization engine 116 can modify one or more portions of a word lattice generated by the ASR model, while generating a further text representation of a further utterance, based on a portion of a misrecognition pair 114. In some implementations, ASR personalization engine 116 can modify one or more portions of a word lattice, generated by the ASR model, based on the subsequent text representation of the subsequent utterance portion of a misrecognition pair 114 by, for example, inserting one or more additional arcs into the word lattice that may not otherwise have been generated by the ASR model. Additionally or alternatively, ASR personalization engine 116 can use the subsequent text representation of a subsequent utterance portion of a misrecognition pair to change the weight of one or more arcs (e.g., increase the weight of one or more arcs) in the word lattice, where the arc(s) were generated using the ASR model.

In some implementations, context engine 206 can determine one or more contextual signals which can be used in training the ASR model to personalize the ASR model. In some implementations, one or more contextual signals can correspond to a user profile of the user, the computing system, a dialog session between the user and the computing system, and/or additional or alternative signal(s). Contextual signal(s) can be based on short term previous query history, long term aggregated history, user action content, and/or additional or alternative information. Short term previous query history can include (1) a topic of the subsequent utterance, (2) a phonetic distance between the subsequent utterance and one or more previous utterances in the dialog session, (3) a text edit distance between the subsequent utterance and the one or more previous utterances in the dialog session, and/or additional or alternative information related to recent query history. In some implementations, the text edit distance can include a Levenstein distance, a Hamming distance, a L1 distance, a Jaro-Winkler distance, and/or additional or alternative distance(s) between a first text string and a second text string. Long term aggregated history can include (1) a plurality of frequently used words corresponding with the user profile (2) additional information corresponding with the user profile, and/or additional or alternative information related to the user's queries over time. In some implementations, frequently used words can be the words a user speaks with the highest frequency (e.g., the ten words the user speaks with the highest frequency, the five words the user speaks with the highest frequency). Additionally or alternatively, frequently used words can indicate any word spoken by the user at least a threshold quantity of times (e.g., words spoken at least 10 times, at least 50 times, at least 100 times, and/or at least an additional quantity of times). User action content can include one or more states of the computing system during the dialog session (e.g., contextual signal(s) indicating the user is playing music).

In some implementations, ASR personalization engine 116 can train ASR model 114 using one or more contextual signals determined by context engine 206. For example, the ASR model can be trained to process (1) audio data capturing an utterance and (2) contextual signal(s) to generate the text representation of the utterance.

Figure 3:
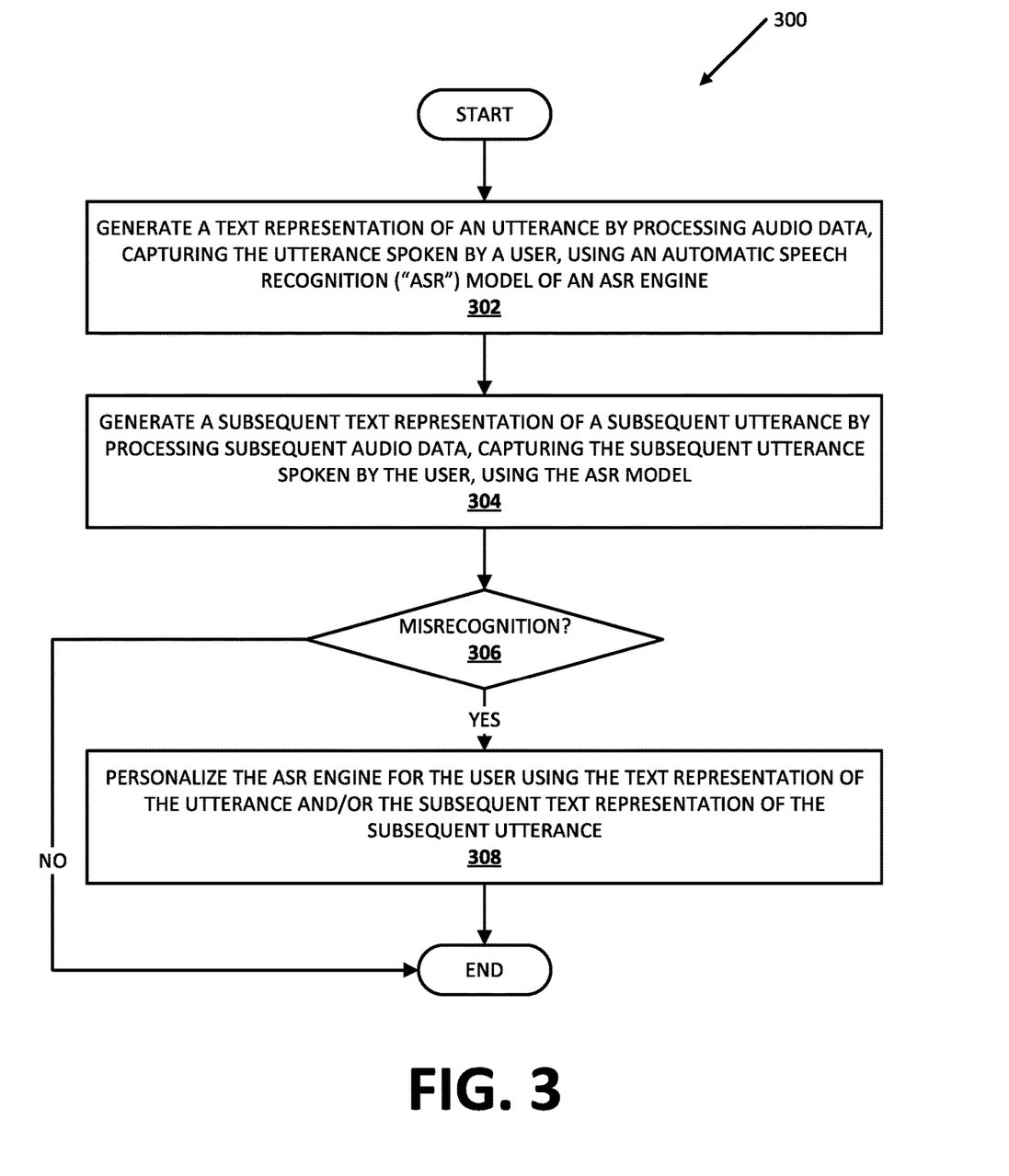
FIG. 3 is a flowchart illustrating an example process of personalizing an ASR engine in accordance with various implementations disclosed herein.

FIG. 3 is a flowchart illustrating a process 300 of personalizing an ASR engine for a user in accordance with implementations disclosed herein. For convenience, the operations of the flowchart are described with reference to a system that performs the operations. This system may include various components of various computer systems, such as one or more components of computing system 202, and/or computing system 510. Moreover, while operations of process 300 are shown in a particular order, this is not meant to be limiting. One or more operations may be reordered, omitted, and/or added.

At block 302, the system generates a text representation of an utterance by processing audio data, capturing the utterance spoken by a user, using an ASR model of an ASR engine. For example, one or more microphones of computing system 202 as illustrated in FIG. 2, can capture audio data capturing a spoken utterance of "OK Assistant, set the temperature to 72 degrees". The ASR model can process the audio data to generate a text representation of the utterance. In some implementations, the ASR model can generate a text representation of the spoken utterance of "OK Assistant, set the temperature to 72 degrees" where the text representation of the utterance is not a misrecognition of the utterance. In some other implementations, the text representation of the utterance generated by processing the audio data using the ASR model may be a misrecognition of the utterance, such as a text representation of the utterance of "OK Assistant, set the temperature to 70 degrees", where "70 degrees" is a misrecognition of "72 degrees". In some implementations, a computing system can perform one or more actions based on the text representation of the utterance. For example, the computing system can set the temperature of a networked smart thermostat to 70 degrees and render output of "OK, changing the temperature to 70 degrees" based on the text representation of the utterance of "OK Assistant, set the temperature to 70 degrees".

At block 304, the system generates a subsequent text representation of a subsequent utterance by processing subsequent audio data, capturing the subsequent utterance spoken by the user, using the ASR model. In some implementations, audio data capturing the subsequent utterance can be captured via one or more microphones of the computing system. In some implementations, the user can speak the subsequent utterance based on the text representation of the utterance being a misrecognition of the utterance (e.g., the text representation of the utterance generated at block 302 being a misrecognition of the utterance). For example, the user can speak the subsequent utterance of "NO, set the thermostat to 72 degrees" (with emphasis on the word two) in response to the computing system rendering output of "OK, changing the temperature to 70 degrees" which may indicate the text representation of the utterance is a misrecognition of the utterance.

At block 306, the system determines whether the user spoke the subsequent utterance based on the text representation of the utterance, generated using the ASR model, being a misrecognition of the utterance. In some implementations, the system determines whether the user spoke the subsequent utterance based on the text representation of the utterance being a misrecognition of the utterance in accordance with process 400 of FIG. 4 described herein. If the system determines the user spoke the subsequent utterance based on the text representation of the utterance being a misrecognition of the utterance, the process proceeds to block 308. If not, the process ends.

At block 308, the system personalizes the ASR engine for the user using the text representation of the utterance and/or the subsequent text representation of the subsequent utterance. In some implementations, the system can personalize the ASR model for the user by training the ASR model using the utterance and the subsequent utterance. For example, the system can use the audio data capturing the utterance and the subsequent text representation of the utterance as a training instance to train the ASR model. In some implementations, the system can process the audio data capturing the utterance as to generate a candidate text representation of the utterance. The system can determine a difference between the candidate text representation of the utterance and the subsequent text representation of the utterance portion of the training instance. In some implementations, the system can update one or more portions of the ASR model based on the determined difference (e.g., through backpropagation).

In some implementations, the system can use the text representation of the utterance and the subsequent text representation of the subsequent utterance can be used to rewrite a further text representation of a further utterance. For example, the system can capture further audio data capturing the further utterance spoken by the user via one or more microphones of the computing system. In some implementations, the further audio data capturing the further utterance can be processed using the ASR model to generate the further text representation of the further utterance. However, the further text representation of the further utterance may be a misrecognition of the further utterance. In some of those implementations, the ASR engine can rewrite the further text representation of the further utterance based on a previous correction of the misrecognition by the user (i.e., based on the utterance and the subsequent utterance, where the user corrects the misrecognition of the utterance with the subsequent utterance).

For example, the user can speak the utterance "OK Assistant, call John Doe", where the ASR model is used to generate a misrecognition of the utterance of "OK Assistant, call John Foe", where "Foe" is a misrecognition of "Doe". The user can speak the subsequent utterance of "OK Assistant, call John DOE" in response to the system calling John Foe, where the ASR model can be used in generating a subsequent text representation of the subsequent utterance of "OK Assistant, call John Doe". Audio data capturing the utterance and the subsequent text representation of the subsequent utterance (e.g., where the subsequent utterance correcting the misrecognition of Doe as Foe by the ASR model) can be used to rewrite one or more further utterances spoken by the user including the name John Doe. For instance, the user can later speak the further utterance of "Hey Assistant, call John Doe" (e.g., the user can speak the further utterance later in the day, the next day, the next week, the next month, etc.). The system can generate the further text representation of "Hey Assistant, call John Foe" by processing further audio data capturing the further utterance using the ASR model, where the Foe is a misrecognition of Doe. In some implementations, the system can rewrite the further text representation of the further utterance based on the utterance and the text representation of the subsequent utterance, where the further text representation of the further utterance can be rewritten to correct the misrecognition as "Hey Assistant, call John Doe". In other words, where a user has corrected a misrecognition, the system can use the correction to rewrite the same (or substantially similar) misrecognition of further utterances without the user having to make the correction of the misrecognition again.

In some implementations, the system can use the utterance and the subsequent utterance to modify a word lattice generated by the ASR model as part of generating a text representation of a further utterance. For example, the system can provide one or more additional arcs in the word lattice based on previous misrecognitions, where the one or more additional arcs in the word lattice can be processed by the ASR model as additional or alternative candidate text representations of the further utterance. The ASR model may select one of these additional or alternative candidate text representations of the further utterance when generating the further text representation of the further utterance.

Figure 4:
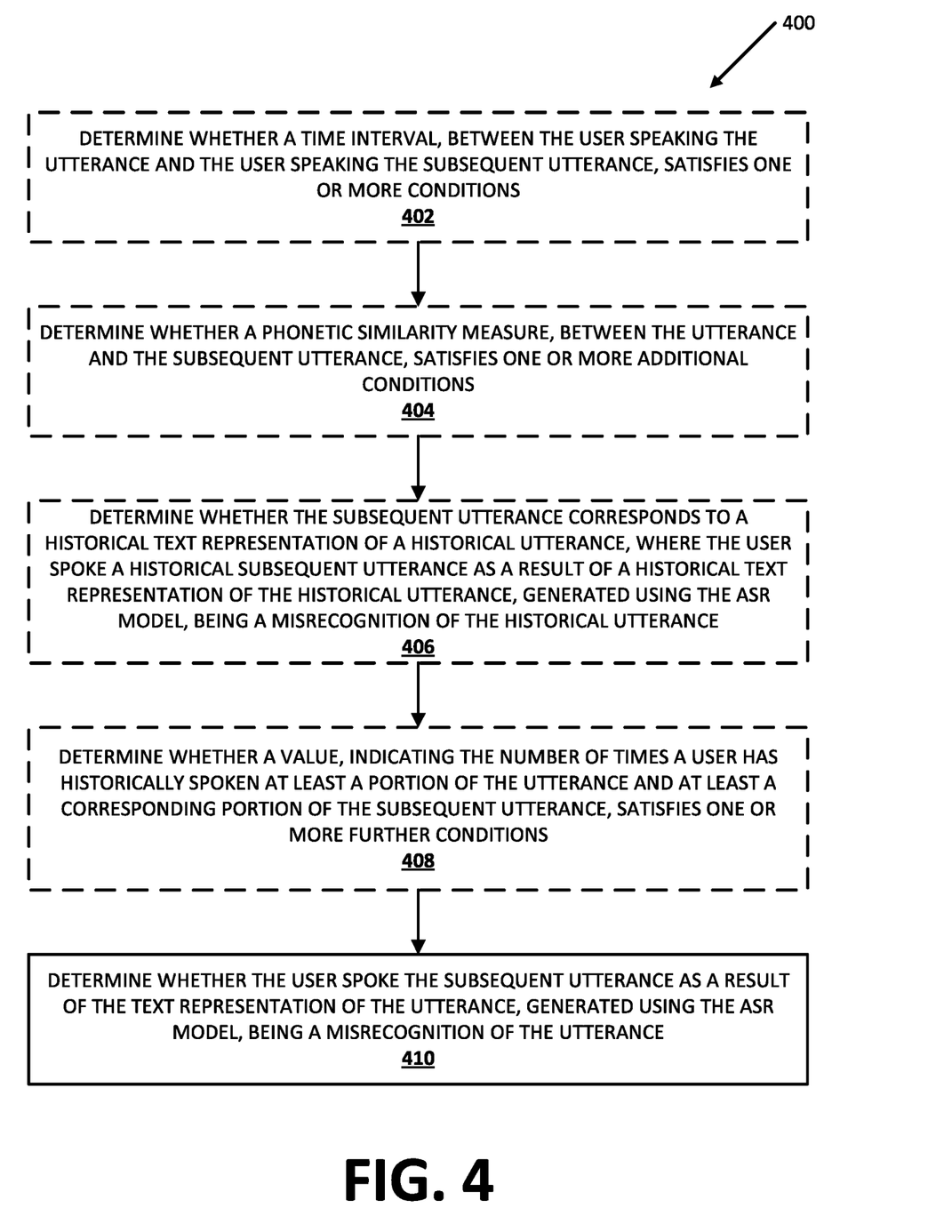
FIG. 4 is a flowchart illustrating an example process of determining whether a user spoke a subsequent utterance as a result of a text representation of an utterance, generated using an ASR model, being a misrecognition of the utterance in accordance with various implementations disclosed herein.

FIG. 4 is a flowchart illustrating a process 400 of determining whether a user spoke a subsequent utterance as a result of a text representation of an utterance being a misrecognition of the utterance in accordance with implementations disclosed herein. For convenience, the operations of the flowchart are described with reference to a system that performs the operations. This system may include various components of various computer systems, such as one or more components of computing system 202, and/or computing system 510. Moreover, while operations of process 400 are shown in a particular order, this is not meant to be limiting. One or more operations may be reordered, omitted, and/or added.

At block 402, the system determines whether a time interval, between the user speaking the utterance and the user speaking the subsequent utterance, satisfies one or more conditions. In some implementations, the system can determine whether the time interval between the user speaking the utterance and the user speaking the subsequent utterance is below a threshold value (e.g., the time interval is below 10 seconds, below 5 seconds, below 3 seconds, below 1 second and/or below additional or alternative threshold values of time) and/or satisfies one or more additional or alternative conditions (e.g., whether the utterance and the subsequent utterance are spoken by the user in the same dialog session with the client device).

At block 404, the system determines whether a phonetic similarity measure, between one or more portions of the utterance and one or more corresponding portions of the subsequent utterance, satisfies one or more additional conditions. In some implementations, the system can determine whether the phonetic similarity measure exceeds a threshold value and/or whether the phonetic similarity measure satisfies one or more additional or alternative conditions. For example, the system can determine a phonetic similarity measure based on the phonetic similarity between an utterance of "OK Assistant, turn on the kitchen lights" and a subsequent utterance of "OK Assistant, turn on ALL of the kitchen lights". In some implementations, the system can determine whether the phonetic similarity measure exceeds a threshold value.

At block 406, the system determines whether the subsequent utterance corresponds to a historical text representation of a historical utterance, where the user spoke a historical subsequent utterance as a result of a historical text representation of the historical utterance, generated using the ASR model, being a misrecognition of the historical utterance. In some implementations, the system may determine whether the user corrected a misrecognition of the subsequent text representation of the subsequent utterance in a historical misrecognition pair. For example, a user can speak utterance A and subsequent utterance B. Additionally or alternatively, the user can previously have spoken the historical utterance C and the historical subsequent utterance D, where historical subsequent utterance D was spoken as a result of a misrecognition of historical utterance C. In some implementations, the system can determine whether the subsequent text representation of the subsequent utterance B is the same as (or substantially similar to) the historical text representation of the historical utterance C, which may indicate the user has previously spoken historical subsequent utterance D as a result of a misrecognition, generated by the ASR model, of subsequent utterance B. In some implementations, this may provide an indication that the subsequent text representation of subsequent utterance B may be a misrecognition of subsequent utterance B, and that utterance A and subsequent utterance B should not be used as a misrecognition pair.

At block 408, the system determines whether a value, indicating the number of times a user has spoken at least a portion of the utterance and at least a corresponding portion of the subsequent utterance, satisfies one or more further conditions. In some implementations, a user profile can store the number of times a user has corrected a misrecognized utterance (i.e., the user profile can store the number of times the user has spoken a subsequent utterance in response to a misrecognition of at least a portion of an utterance). In some implementations, the system can determine whether the number of times the user has "corrected" at least a portion of a misrecognized utterance exceeds a threshold value and/or satisfies one or more additional or alternative conditions.

At block 410, the system determines whether the user spoke the subsequent utterance as a result of the text representation of the utterance, generated using the ASR model, being a misrecognition of the utterance. In some implementations, the system can determine whether the user spoke the subsequent utterance as a result of the text representation being a misrecognition of the utterance based on one or more of the determination(s) made at block 402, 404, 406, 408, and/or based on one or more additional or alternative determinations made by the system. For example, a system can determine whether the user spoke the subsequent utterance as a result of the text representation of the utterance being a misrecognition of the utterance based on whether the time interval between the utterance and the subsequent utterance satisfies the one or more conditions (e.g., as described in block 402), and based on whether the value indicating the number of times a user has historically spoken at least a portion of the utterance and at least a corresponding portion of the subsequent utterance satisfies the one or more further conditions (e.g., as described in block 408). As a further example, the system can determine whether the user spoke the subsequent utterance as a result of the text representation of the utterance being a misrecognition of the utterance based on whether a phonetic similarity measure between the utterance and the subsequent utterance satisfies the one or more additional conditions (e.g., as described in block 404), based on whether the text representation of the subsequent utterance corresponds to a historical text representation of a historical utterance (e.g., as described in block 406), and based on whether the value indicating the number of times a user has historically spoken at least a portion of the utterance and at least a corresponding portion of the subsequent utterance satisfies the one or more further conditions (e.g., as described in block 408).

Figure 5:
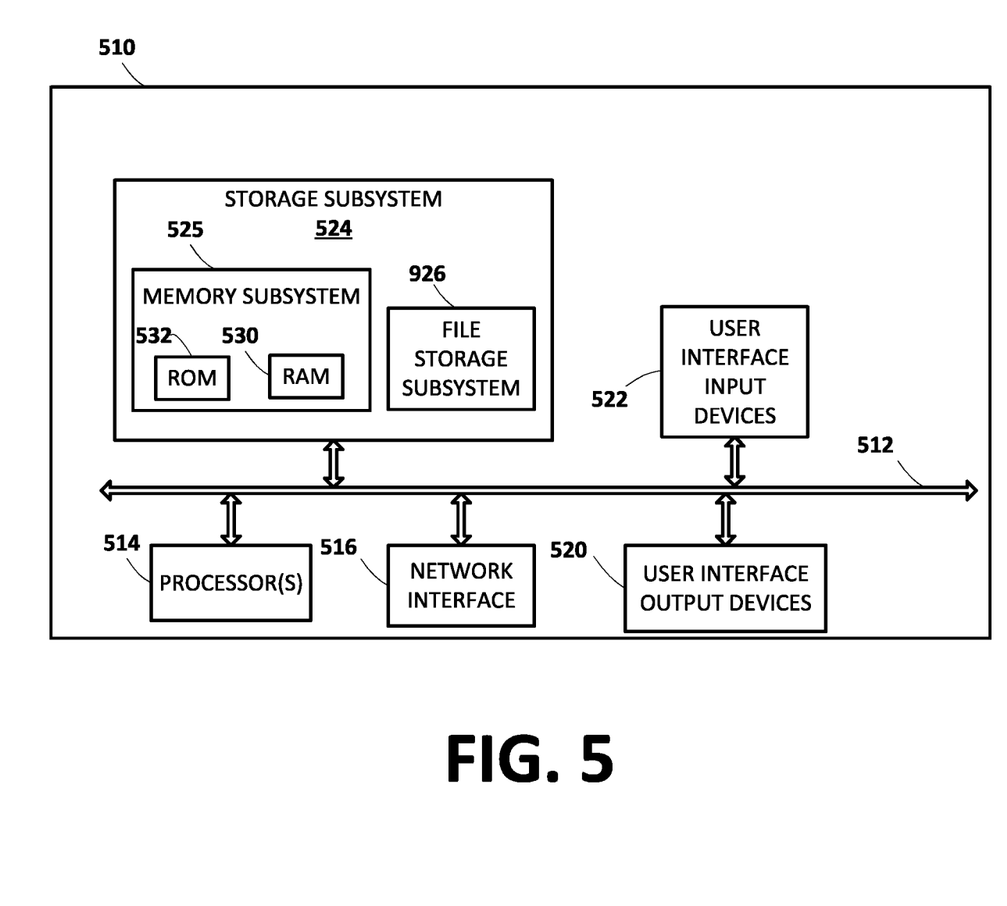
FIG. 5 illustrates an example architecture of a computing device.

FIG. 5 is a block diagram of an example computing device 510 that may optionally be utilized to perform one or more aspects of techniques described herein. In some implementations, one or more of a client computing device, and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of one or more of the processes of FIG. 3 and/or FIG. 4, as well as to implement various components depicted in FIG. 2.

These software modules are generally executed by processor 514 alone or in combination with other processors. Memory 525 used in the storage subsystem 524 can include a number of memories including a main random access memory ("RAM") 530 for storage of instructions and data during program execution and a read only memory ("ROM") 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method including processing audio data capturing an utterance, spoken by a user, using an automatic speech recognition ("ASR") model of an ASR engine, to generate a text representation of the utterance. In some implementations, the method includes processing, using the ASR model, subsequent audio data capturing a subsequent utterance, spoken by the user subsequent to the utterance, to generate a subsequent text representation of the subsequent utterance. In some implementations, the method includes determining, based on the subsequent text representation of the subsequent utterance, whether the user spoke the subsequent utterance as a result of the text representation of the utterance, generated using the ASR model, being a misrecognition of the utterance. In some implementations, in response to determining the text representation of the utterance is a misrecognition of the utterance and the user spoke the subsequent utterance as a result of the misrecognition, the method includes personalizing the ASR engine, for the user, using the text representation of the utterance and/or the text representation of the subsequent utterance.

These and other implementations of the technology disclosed herein can include one or more of the following features.

In some implementations, personalizing the ASR engine, for the user, using the text representation of the utterance and/or the subsequent text representation of the subsequent utterance includes training the ASR model, to personalize the ASR model for the user, based on (1) the audio data capturing the utterance and (2) the subsequent text representation of the subsequent utterance.

In some implementations, personalizing the ASR engine, for the user, using the text representation of the utterance and/or the subsequent text representation of the subsequent utterance includes using the text representation of the utterance and the subsequent text representation of the subsequent utterance to rewrite a further text representation of a further utterance spoken by the user.

In some implementations, wherein personalizing the ASR engine, for the user, using the text representation of the utterance and/or the subsequent text representation of the subsequent utterance includes processing, using the ASR model, further audio data capturing a further utterance, spoken by the user, to generate a further text representation of the further utterance, wherein processing, using the ASR model, the further audio data capturing the further utterance includes using the text representation of utterance and the subsequent text representation of the subsequent utterance to modify one or more portions of a word lattice of the ASR model. In some implementations, the method further includes generating the text representation of the further utterance using the modified one or more portions of the word lattice of the ASR model.

In some implementations, personalizing the ASR engine, for the user, using the text representation of the utterance and/or the subsequent text representation of the subsequent utterance includes using the subsequent text representation of the subsequent utterance to rewrite a further text representation of a further utterance spoken by the user.

In some implementations, personalizing the ASR engine, for the user, using the text representation of the utterance and/or the subsequent text representation of the subsequent utterance includes processing, using the ASR model, further audio data capturing a further utterance, spoken by the user, to generate a further text representation of the further utterance, wherein processing, using the ASR model, the further audio data capturing the further utterance includes using the subsequent text representation of the subsequent utterance to modify one or more portions of a word lattice of the ASR model. In some implementations, the method further includes generating the text representation of the further utterance using the modified one or more portions of the word lattice of the ASR model.

In some implementations, determining, based on the subsequent text representation of the subsequent utterance, whether the user spoke the subsequent utterance as a result of the text representation of the utterance, generated using the ASR model, being a misrecognition of the utterance includes determining a time interval between (1) the user speaking the utterance and (2) the user speaking the subsequent utterance. In some implementations, the method further includes determining whether the time interval satisfies one or more conditions. In some implementations, the method further includes determining the user spoke the subsequent utterance as a result of the text representation of the utterance, generated using the ASR model, being a misrecognition of the utterance based on determining the time interval satisfies the one or more conditions. In some of those implementations, determining whether the time interval satisfies one or more of the conditions includes determining whether the time interval is below a threshold value of time.

In some implementations, determining, based on the subsequent text representation of the subsequent utterance, whether the user spoke the subsequent utterance as a result of the text representation of the utterance, generated using the ASR model, being a misrecognition of the utterance includes determining a phonetic similarity measure between (1) the text representation of the utterance and (2) the text representation of the subsequent utterance. In some implementations, the method further includes determining whether the phonetic similarity measure satisfies one or more other conditions. In some implementations, the method further includes determining the user spoke the subsequent utterance as a result of the text representation of the utterance, generated using the ASR model, being a misrecognition of the utterance based on determining the phonetic similarity satisfies the one or more other conditions. In some versions of those implementations, determining whether the phonetic similarity measure satisfies the one or more other conditions includes determining whether the phonetic similarity measure is above a threshold value of phonetic similarity.

In some implementations, determining, based on the subsequent text representation of the subsequent utterance, whether the user spoke the subsequent utterance as a result of the text representation of the utterance, generated using the ASR model, being a misrecognition of the utterance includes identifying a historical text representation of a historical utterance previously spoken by the user, and a historical subsequent text representation of a historical subsequent utterance previously spoken by the user subsequent to the historical utterance, wherein the user spoke the historical subsequent utterance as a result of the historical text representation of the historical utterance, generated using the ASR model, being a misrecognition of the historical utterance. In some implementations, the method further includes determining whether the text representation of the subsequent utterance corresponds to the historical text representation of the historical utterance. In some implementations, the method further includes determining the user spoke the subsequent utterance as a result of the text representation of the utterance, generated using the ASR model, being a misrecognition of the utterance based on determining the subsequent utterance does not correspond to the historical text representation of the historical utterance.

In some implementations, determining, based on the subsequent text representation of the subsequent utterance, whether the user spoke the subsequent utterance as a result of the text representation of the utterance, generated using the ASR model, being a misrecognition of the utterance includes determining a value indicating a number of times the user has historically spoken at least a portion of the utterance and at least a corresponding portion of the subsequent utterance. In some implementations, the method further includes determine whether the value satisfies one or more further conditions. In some implementations, the method further includes determining the user spoke the subsequent utterance as a result of the text representation of the utterance, generated using the ASR model, being a misrecognition of the utterance based on determining the value satisfies the one or more further conditions. In some versions of those implementations, determining whether the value satisfies the one or more further conditions includes determining whether the value is above a threshold value.

In some implementations, training the ASR model, to personalize the ASR model for the user, based on (1) the audio data capturing the utterance and (2) the text representation of the subsequent utterance includes processing the audio data capturing the utterance using the ASR model to generate a candidate text representation of the utterance. In some implementations, the method further includes determining a loss based on the candidate text representation of the utterance and the text representation of the subsequent utterance. In some implementations, the method further includes updating one or more portions of the ASR model based on the determined loss.

In some implementations, training the ASR model, to personalize the ASR model for the user, based on (1) the audio data capturing the utterance and (2) the text representation of the subsequent utterance includes identifying a dialog session where a client device captures the spoken utterance and the subsequent spoken utterance. In some implementations, the method further includes determining one or more contextual signals corresponding to a user profile of the user, the client device, and/or the dialog session. In some implementations, the method further includes processing the one or more contextual signals along with the audio data capturing the utterance using the personalized ASR model to generate the candidate text representation of the utterance. In some implementations, the method further includes determining a loss based on the candidate text representation of the utterance and the text representation of the subsequent utterance. In some implementations, the method further includes updating one or more portions of the personalized ASR model based on the determined loss. In some versions of those implementations, determining the one or more contextual signals corresponding to the user profile of the user, the client device and/or the dialog session includes determining the one or more contextual signals based on short term previous query history including (1) a topic of the subsequent utterance, (2) a phonetic distance between the subsequent utterance and one or more previous utterances in the dialog session, and/or (3) a text edit distance between the subsequent utterance and the one or more previous utterances in the dialog session. In some versions of those implementations, determining the one or more contextual signals corresponding to the user profile of the user, the client device, and/or the dialog session includes determining the one or more contextual signals based on long term aggregated history including (1) a plurality of frequently used words corresponding with the user profile and/or (2) additional information corresponding with the user profile. In some versions of those implementations, determining the one or more contextual signals corresponding to the user profile of the user, the client device, and/or the dialog session includes determining the one or more contextual signals based on user action content including one or more states of the client device during the dialog session.

In some implementations, the subsequent utterance is spoken by the user immediately subsequent to the utterance.

In some implementations, the method further includes processing, using the ASR model, interposing audio data capturing an interposing utterance, spoken by the user interposing between the utterance and the subsequent utterance, to generate an interposing text representation of the interposing utterance. In some implementations, the method further includes determining, based on the subsequent text representation of the subsequent utterance, whether the user spoke the subsequent utterance as a result of the interposing text representation of the interposing utterance, generated using the ASR model, being an interposing misrecognition of the interposing utterance. In some implementations, in response to determining the interposing text representation of the interposing utterance is an interposing misrecognition of the interposing utterance and the user spoke the subsequent utterance as a result of the interposing misrecognition, the method further includes personalizing the ASR engine, for the user, using the text representation of the interposing utterance and/or the text representation of the subsequent utterance.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
   processing audio data capturing an initial utterance, spoken by a user, using an automatic speech recognition ("ASR") model of an ASR engine, to generate an initial text representation of the initial utterance;
   processing, using the ASR model, subsequent audio data capturing a subsequent utterance, spoken by the user subsequent to the initial utterance, to generate a subsequent text representation of the subsequent utterance;
   determining whether the user spoke the subsequent utterance as a result of the initial text representation being an initial misrecognition of the initial utterance, wherein determining whether the user spoke the subsequent utterance as a result of the initial text representation being the initial misrecognition comprises:
   identifying one or more historical misrecognitions corresponding to one or more historical text representations for one or more historical utterances spoken by the user,
   including a given historical misrecognition that includes a given historical text representation of a given historical utterance, previously spoken by the user, and an additional historical text representation of an additional historical utterance,
wherein the additional historical utterance was previously spoken by the user subsequent to speaking the given historical utterance, and
wherein the given historical text representation is the given historical misrecognition of the given historical utterance;
determining that the subsequent text representation of the subsequent utterance does not correspond to any of the one or more historical text representations, including determining that the subsequent text representation of the subsequent utterance does not correspond to the given historical text representation of the given historical utterance based on comparing the given historical text representation of the given historical utterance with the subsequent text representation of the subsequent utterance;
in response to determining the subsequent text representation of the subsequent utterance does not correspond to any of the one or more historical text representations:
determining the initial text representation of the initial utterance is the initial misrecognition, and
determining the user spoke the subsequent utterance as a result of the initial misrecognition of the initial utterance; and
in response to determining the initial text representation is the initial misrecognition, and the user spoke the subsequent utterance as a result of the initial misrecognition:
personalizing the ASR engine, for the user, using the initial text representation or the subsequent text representation, wherein personalizing the ASR engine, for the user, using the initial text representation or the subsequent text representation comprises:
training the ASR model, to personalize the ASR model for the user, based on (1) the audio data capturing the initial utterance and (2) the subsequent text representation of the subsequent utterance.

2. The method of claim 1, wherein personalizing the ASR engine, for the user, using the initial text representation or the subsequent text representation comprises:
using the subsequent text representation to rewrite a further text representation of a further utterance spoken by the user.

3. The method of claim 1, wherein personalizing the ASR engine, for the user, using the initial text representation or the subsequent text representation comprises:
processing, using the ASR model, further audio data capturing a further utterance, spoken by the user, to generate a further text representation of the further utterance, wherein processing, using the ASR model, the further audio data capturing the further utterance comprises:
using the subsequent text representation to modify one or more portions of a word lattice of the ASR model; and
generating the further text representation using the modified one or more portions of the word lattice of the ASR model.

4. The method of claim 1, wherein determining, based on the subsequent text representation, whether the user spoke the subsequent utterance as a result of the initial text representation, generated using the ASR model, being the initial misrecognition of the initial utterance comprises:
determining a time interval between (1) the user speaking the initial utterance and (2) the user speaking the subsequent utterance;
determining whether the time interval satisfies one or more conditions; and
determining the user spoke the subsequent utterance as a result of the text representation of the initial utterance, generated using the ASR model, being a misrecognition of the initial utterance based on determining the time interval that satisfies the one or more conditions.

5. The method of claim 4, wherein determining whether the time interval satisfies the one or more conditions comprises determining whether the time interval is below a threshold value of time.

6. The method of claim 1, wherein determining, based on the subsequent text representation, whether the user spoke the subsequent utterance as a result of the initial text representation, generated using the ASR model, being the initial misrecognition of the initial utterance comprises:
determining a phonetic similarity measure between (1) the initial text representation and (2) the subsequent text representation;
determining whether the phonetic similarity measure satisfies one or more other conditions; and
determining the user spoke the subsequent utterance as a result of the initial text representation, generated using the ASR model, being a misrecognition of the initial utterance based on determining the phonetic similarity satisfies the one or more other conditions.

7. The method of claim 6, wherein determining whether the phonetic similarity measure satisfies the one or more other conditions comprises determining whether the phonetic similarity measure is above a threshold value of phonetic similarity.

8. The method of claim 1, wherein training the ASR model, to personalize the ASR model for the user, based on (1) the audio data capturing the initial utterance and (2) the subsequent text representation of the subsequent utterance comprises:
processing the audio data capturing the initial utterance using the ASR model to generate a candidate text representation of the initial utterance;
determining a loss based on the candidate text representation of the initial utterance and the subsequent text representation of the subsequent utterance; and
updating one or more portions of the ASR model based on the determined loss.

9. The method of claim 1, wherein training the ASR model, to personalize the ASR model for the user, based on (1) the audio data capturing the initial utterance and (2) the subsequent text representation of the subsequent utterance comprises:
identifying a dialog session where a client device captures the initial utterance and the subsequent utterance;
determining one or more contextual signals corresponding to a user profile of the user, the client device, and/or the dialog session;
processing the one or more contextual signals along with the audio data capturing the initial utterance using the personalized ASR model to generate a candidate text representation of the initial utterance;
determining a loss based on the candidate text representation of the initial utterance and the subsequent text representation of the subsequent utterance; and updating one or more portions of the personalized ASR model based on the determined loss.

10. The method of claim 9, wherein determining the one or more contextual signals corresponding to the user profile of the user, the client device and/or the dialog session comprises:
determining the one or more contextual signals based on short term previous query history including (1) a topic of the subsequent utterance, (2) a phonetic distance between the subsequent utterance and one or more previous utterances in the dialog session, and/or (3) a text edit distance between the subsequent utterance and the one or more previous utterances in the dialog session.

11. The method of claim 9, wherein determining the one or more contextual signals corresponding to the user profile of the user, the client device, and/or the dialog session comprises:
determining the one or more contextual signals based on long term aggregated history including (1) a plurality of frequently used words corresponding with the user profile and/or (2) additional information corresponding with the user profile.

12. The method of claim 9, wherein determining the one or more contextual signals corresponding to the user profile of the user, the client device, and/or the dialog session comprises:
determining the one or more contextual signals based on user action content including one or more states of the client device during the dialog session.

13. The method of claim 1, wherein the subsequent utterance is spoken by the user immediately subsequent to the initial utterance.

14. The method of claim 1, further comprising:
processing, using the ASR model, interposing audio data capturing an interposing utterance, spoken by the user interposing between the initial utterance and the subsequent utterance, to generate an interposing text representation of the interposing utterance;
determining, based on the subsequent text representation, whether the user spoke the subsequent utterance as a result of the interposing text representation, generated using the ASR model, being an interposing misrecognition of the interposing utterance; and
in response to determining the interposing text representation is an interposing misrecognition and the user spoke the subsequent utterance as a result of the interposing misrecognition, personalizing the ASR engine, for the user, using the interposing text representation and/or the subsequent text representation.

15. A computing system comprising:
one or more processors; and
memory storing instructions that, when executed by the one or more processors, cause the one or more processors to:
process audio data capturing an initial utterance, spoken by a user, using an automatic speech recognition ("ASR") model of an ASR engine, to generate an initial text representation of the initial utterance;
process, using the ASR model, subsequent audio data capturing a subsequent utterance, spoken by the user subsequent to the initial utterance, to generate a subsequent text representation of the subsequent utterance;
determine whether the user spoke the subsequent utterance as a result of the initial text representation being an initial misrecognition of the initial utterance, wherein determining whether the user spoke the subsequent utterance as a result of the initial text representation being the initial misrecognition comprises:
identify one or more historical misrecognitions corresponding to one or more historical text representations for one or more historical utterances spoken by the user,
include a given historical misrecognition that includes a given historical text representation of a given historical utterance, previously spoken by the user, and an additional historical text representation of an additional historical utterance,
wherein the additional historical utterance was previously spoken by the user subsequent to speaking the given historical utterance, and
wherein the given historical text representation is the given historical misrecognition of the given historical utterance;
determine that the subsequent text representation of the subsequent utterance does not correspond to any of the one or more historical text representations, including determining that the subsequent text representation of the subsequent utterance does not correspond to the given historical text representation of the given historical utterance based on comparing the given historical text representation of the given historical utterance with the subsequent text representation of the subsequent utterance;
in response to determining the subsequent text representation of the subsequent utterance does not correspond to any of the one or more historical text representations:
determine the initial text representation of the initial utterance is the initial misrecognition, and
determine the user spoke the subsequent utterance as a result of the initial misrecognition of the initial utterance; and
in response to determining the initial text representation is the initial misrecognition, and the user spoke the subsequent utterance as a result of the initial misrecognition:
personalize the ASR engine, for the user, using the initial text representation or the subsequent text representation, wherein personalizing the ASR engine, for the user, using the initial text representation or the subsequent text representation comprises:
train the ASR model, to personalize the ASR model for the user, based on (1) the audio data capturing the initial utterance and (2) the subsequent text representation of the subsequent utterance.

16. A non-transitory computer-readable storage medium storing instructions executable by one or more processors of a computing system to cause the one or more processors to:
process audio data capturing an initial utterance, spoken by a user, using an automatic speech recognition ("ASR") model of an ASR engine, to generate an initial text representation of the initial utterance;
process, using the ASR model, subsequent audio data capturing a subsequent utterance, spoken by the user subsequent to the initial utterance, to generate a subsequent text representation of the subsequent utterance;
determine whether the user spoke the subsequent utterance as a result of the initial text representation being an initial misrecognition of the initial utterance, wherein determining whether the user spoke the subsequent utterance as a result of the initial text representation being the initial misrecognition comprises:
identify one or more historical misrecognitions corresponding to one or more historical text representations for one or more historical utterances spoken by the user,
include a given historical misrecognition that includes a given historical text representation of a given historical utterance, previously spoken by the user, and an additional historical text representation of an additional historical utterance,
wherein the additional historical utterance was previously spoken by the user subsequent to speaking the given historical utterance, and
wherein the given historical text representation is the given historical misrecognition of the given historical utterance;
determine that the subsequent text representation of the subsequent utterance does not correspond to any of the one or more historical text representations, including determining that the subsequent text representation of the subsequent utterance does not correspond to the given historical text representation of the given historical utterance based on comparing the given historical text representation of the given historical utterance with the subsequent text representation of the subsequent utterance;
in response to determining the subsequent text representation of the subsequent utterance does not correspond to any of the one or more historical text representations:
determine the initial text representation of the initial utterance is the initial misrecognition, and
determine the user spoke the subsequent utterance as a result of the initial misrecognition of the initial utterance; and
in response to determining the initial text representation is the initial misrecognition, and the user spoke the subsequent utterance as a result of the initial misrecognition:
personalize the ASR engine, for the user, using the initial text representation or the subsequent text representation, wherein personalizing the ASR engine, for the user, using the initial text representation or the subsequent text representation comprises:
train the ASR model, to personalize the ASR model for the user, based on (1) the audio data capturing the initial utterance and (2) the subsequent text representation of the subsequent utterance.

* * * * *